Oct. 3, 1939.   T. W. SLUTZ   2,174,929
ANIMAL TRAP
Filed Aug. 7, 1937

INVENTOR.
THOMAS W. SLUTZ
BY Bates, Goldrick, & Teare
ATTORNEYS

Patented Oct. 3, 1939

2,174,929

UNITED STATES PATENT OFFICE 2,174,929

ANIMAL TRAP

Thomas W. Slutz, Cleveland, Ohio

Application August 7, 1937, Serial No. 157,921

8 Claims. (Cl. 43—83)

This invention relates broadly to animal traps, and more specifically to that type of trap used for catching mice. One of the chief objections to existing mouse traps is the fact that the mouse cannot be readily released without either touching it or endangering one's fingers between the jaws of the trap. A further objection is the difficulty of setting the trap without touching the trigger mechanism and again endangering one's fingers.

An object of the present invention is to provide a trap which may be set automatically, without requiring the operator to handle any part of the trigger mechanism. A further object of this invention is to make a trap, wherein the animal can be released without touching it, and wherein the releasing operation automatically resets the trap.

A still further object is to provide means for supporting and holding the bait entirely independent of the trigger mechanism, and to provide a trap which has a very sensitive trigger; which can be made principally of sheet-metal stampings; and which is simple, efficient, economical to manufacture, and highly satisfactory in use.

Figure 1:
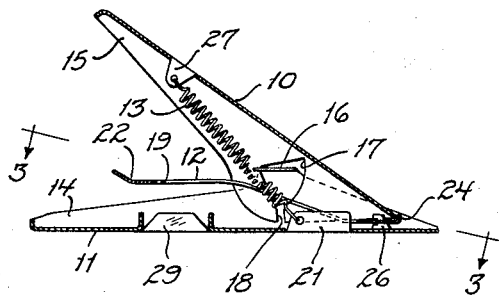
Figure 2:
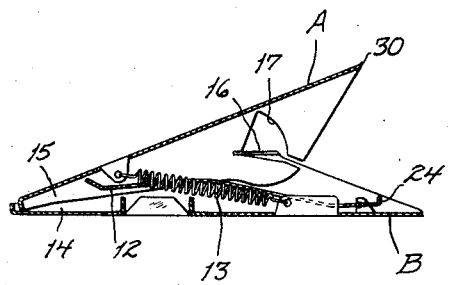
Figure 3:
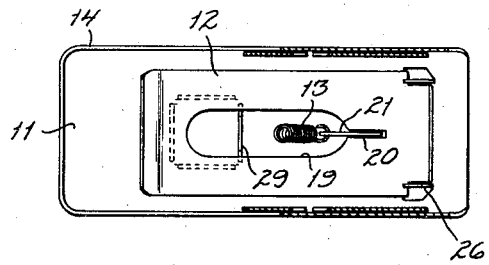
Figure 4:
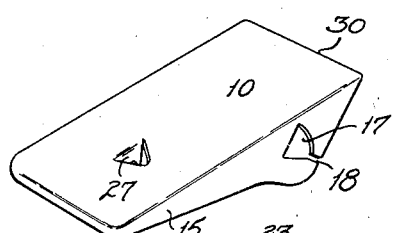
Figure 5:
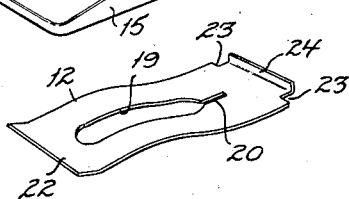

The invention will be further readily understood from the following description, and claims, and from the drawing in which latter; Fig. 1 is a longitudinal vertical section of a trap made in accordance with the present invention, and which is shown in set position; Fig. 2 is a longitudinal vertical section, similar to Fig. 1, but showing the trap in closed position; Fig. 3 is a plan view of the trap, shown partly in section on the plane indicated in Fig. 1, and looking in the direction of arrows 3—3; Fig. 4 is a perspective view of the top or spring-actuated jaw; Fig. 5 is a perspective view of the trigger, and Fig. 6 is a perspective view of the base or spring-actuated jaw of the trap.

The trap forming the subject matter of the present invention has two jaws, which, when in the set-position, provide an entrance for an animal. The upper of such pair of jaws, indicated by the reference numeral 10 (Fig. 1) is spring-actuated, and the lower jaw 11 forms a base which is adapted to rest upon the floor or other supporting surface. A trigger 12 pivotally mounted upon the stationary jaw or base 11 and disposed between the jaws serves to hold the upper jaw 10 in cocked position, independently of the spring 13 in a manner presently described.

Figure 6:
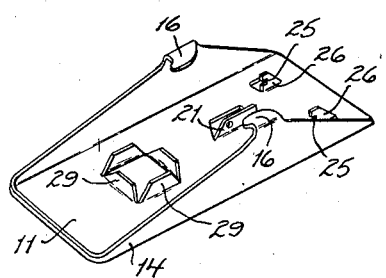

The jaws 10 and 11 and trigger 12 are preferably made of sheet-metal stampings, as best illustrated in Figs. 4, 5 and 6 respectively. For the purpose of adding strength to the jaws and for other reasons, presently explained, the lower jaw or base 11 is preferably provided with an inturned flange 14 along three of its marginal edges, and the upper jaw with a similar inturned flange 15, the construction being such that the flange 15 telescopes the flange 14 when the jaws are in closed position, as shown in Fig. 2.

The flange 14 of jaw 11 is provided with oppositely disposed inturned ears 16—16 which are received by fan-shaped openings 17—17 in flange 15 of upper jaws 10 (preferably by way of slots 18—18), and in this manner the jaws are pivotally connected together.

The plate which comprises the trigger 12 of the present invention, is preferably curved between its ends, as shown in Fig. 5, and is provided with a centrally disposed elongated opening 19 which serves as a clearance opening for the spring 13, as best shown in Fig. 3. One end of the opening 19 terminates in a slot 20, to receive the formed apertured ear 21 stamped upwardly from the base 11. The forward end of the trigger 12 is bent upwardly as at 22 for reasons presently to be described, and its rearward end is notched out at 23—23 and formed upwardly to provide a lip 24 which serves as a latch for the upper jaw. The transverse edge surfaces of notches 23—23 are received by slots 25—25 in upstanding ears 26—26 and in this manner the trigger is pivotally mounted upon the lower jaw 11.

When the trap is assembled, one end of spring 13 is anchored to apertured ear 21 of jaw 11 and its other end is anchored to apertured ear 27 stamped inwardly from jaw 10, as clearly illustrated in Fig. 1.

In the preferred embodiment, the lower jaw or base 11 may have a bait receptacle formed thereon in any suitable manner, but preferably positioned near the forward end of said jaw and below the free end of trigger 12. The bait receptacle illustrated in the drawing, comprises a small receptacle which is formed by a plurality of upwardly pressed ears 29, as best shown in Fig. 6. By forming the ears from contiguous surfaces, there is provided an aperture that is enclosed by them, as a result of which the bait can be inserted from the bottom of the trap. This obviates the necessity for touching any part of the trap which may have been touched by the animal.

When setting the trap, it is only necessary to rock the upper jaw 10 (clockwise as viewed in Fig. 2) about its pivots 16—17 until rear edge surface 30 comes into contact with the trigger 12. This rocking of the upper jaw 10 loads the spring 13 and simultaneously rocks the trigger 12 clockwise until edge 30 thereof moves to position in front of lip 24. Due to the leverage of trigger plate 12 brought about by the major portion of its weight being disposed forwardly of its pivots 23—25, the lip 24 thereof engaging the edge 30 of upper jaw 10 holds the latter in cocked position independently of the spring 13 which is charged at this time. With the trap thus set and baited, it will be understood that the forward free end of trigger 12 will be slightly elevated, as shown in Fig. 1, but not sufficiently so to enable the animal to be trapped, to have unobstructed access to the bait, without further elevating the trigger plate 12 with its nose when attempting to nibble at the bait held in the bait container.

When the animal thus attempts to reach the bait, its nose unavoidably contacts the under side or curved portion 22, of trigger plate 12, and elevates said trigger plate, whereupon lip 24 will release edge 30 of upper jaw 10 and charged spring 13 will quickly act to close said upper jaw by rocking it counter-clockwise upon its pivot as viewed in Fig. 2, thus trapping the animal, or rather the animal's head between the jaws 10 and 11.

To release the animal from the trap and to simultaneously effect resetting of the trap, it is merely necessary to grasp the upper and lower jaws at a point indicated at A and B, respectively, in Fig. 2, and rock the upper jaw 10 on its pivots until the lip 24 again contacts the edge 30 in the manner heretofore described.

A trap made in accordance with the present invention has a trigger mechanism which is so sensitive that it can be tripped by merely blowing upwardly upon the outer end of trigger 12. Furthermore, the trap is advantageous in that it obviates the necessity for touching any part of the trigger mechanism, either to set or release the animal that is entrapped therein.

I claim:

1. An animal trap having a pair of jaws pivoted relatively to one another, trigger means carried by one jaw and adapted to engage the other jaw at the end thereof for automatically setting the trap when the jaws are extended, and means for rapidly closing said jaws when said trigger means is elevated.

2. An animal trap comprising a pair of pivotally connected jaws, a trigger plate loosely pivoted upon one of said jaws, and having means thereon to engage the other of said jaws to hold them in set position when extended a predetermined distance, said trigger plate being operable when elevated to spring the trap and a bait receptacle disposed below said trigger plate.

3. An animal trap, comprising a pair of interconnected jaws, a trigger plate pivotally carried by one jaw and adapted when set, to engage the other jaw and thereby to hold the jaws extended, and means for quickly closing said jaws upon one another when the free end of said trigger plate is elevated.

4. An animal trap of the expanding jaw type comprising a pair of jaws pivotally connected, a trigger plate pivotally mounted upon the lower jaw, a lip on said plate adapted to engage said upper jaw at the end thereof to hold the jaws extended a predetermined distance when in set position, a stationary bait receiver disposed between said lower jaw and trigger plate, and a spring adapted to close said jaws when said trigger plate is elevated.

5. An animal trap comprising a stationary jaw, a movable jaw pivotally connected to said stationary jaw, a trigger plate disposed between said jaws and pivotally supported by said stationary jaw and having an aperture therein, an upturned lip on said plate adapted to engage the end of the movable jaw and hold it in set position, and a spring extending through said aperture in said trigger plate and having its ends anchored to said jaws respectively, whereby when said trigger plate is elevated it releases the holding engagement of its lip with the movable jaw.

6. An animal trap comprising a pair of jaws pivotally connected together, a spring additionally connecting the jaws and so related to the pivotal connection that, when the jaws are separated a predetermined distance the spring approaches but does not pass a dead center position, and a trigger plate pivoted to one jaw and having a relative short latching end portion adapted to engage and latch the spring actuated jaw at the end thereof, said trigger plate being releasable by an elevating movement from engagement with the spring actuated jaw.

7. An animal trap comprising a stationary jaw, a movable jaw pivotally connected to said stationary jaw, a trigger plate disposed between said jaws and pivotally supported by said stationary jaw, means for effecting a latching connection between the end of the plate and the end of the movable jaw, a spring interconnecting said jaws and operative independently of the plate for urging the jaws together, a bait receptacle carried by the stationary jaw, the free end of the plate being disposed above and in close proximity to the bait receptacle, whereby the plate must be elevated to gain access to the bait.

8. An animal trap of the expanding jaw type, comprising a pair of jaws pivotally connected together, a trigger plate pivotally supported upon one of the jaws, a bait receptacle carried by one of the jaws and disposed beneath the free end of the trigger plate means for automatically setting the trap whenever the jaws are open a predetermined extent, and means for springing the trap upon elevation of the free end of the trigger plate.

THOMAS W. SLUTZ.